Jan. 29, 1963  A. J. STEALY ET AL  3,075,722
PIVOTALLY MOUNTED FISHING REEL WITH MOTOR DRIVE
Filed Sept. 6, 1960  3 Sheets-Sheet 1

INVENTORS.
ARTHUR J. STEALY
BY ALVIS P. RICE

Horace B. Van Valkenburgh
ATTORNEY

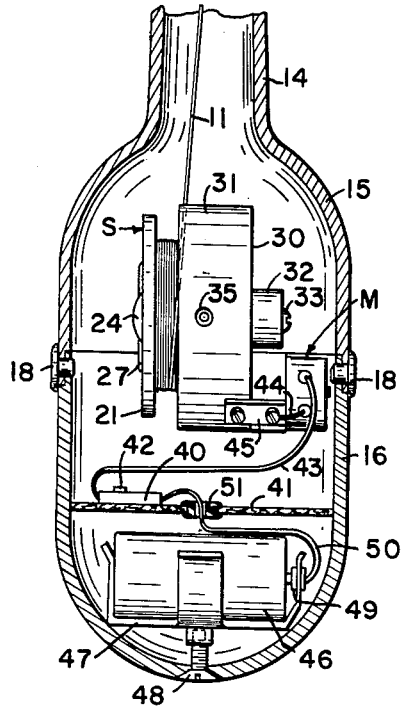

Jan. 29, 1963  A. J. STEALY ET AL  3,075,722
PIVOTALLY MOUNTED FISHING REEL WITH MOTOR DRIVE
Filed Sept. 6, 1960  3 Sheets-Sheet 3

INVENTORS.
ARTHUR J. STEALY
BY ALVIS P. RICE

Horace B. Van Valkenburgh
ATTORNEY

United States Patent Office 3,075,722
Patented Jan. 29, 1963

3,075,722
PIVOTALLY MOUNTED FISHING REEL
WITH MOTOR DRIVE
Arthur J. Stealy, 11405 E. 7th Ave., Aurora, Colo., and Alvis P. Rice, Rte. 1, Box 105A, Adams County, Colo.
Filed Sept. 6, 1960, Ser. No. 54,214
7 Claims. (Cl. 242—84.2)

This invention relates to fishing reels, and more particularly to so-called spinning reels, i.e., spinning reels in which the line is cast off a spool from the end of the spool and the spool is turned to wind the line onto the spool.

Among the objects of the present invention are to provide a novel fishing reel of the spinning type; to provide such a reel in which the spool may be turned for winding the line onto the spool by a motor; to provide such a reel in which the spool is readily moved between casting and winding positions; to provide such a reel in which rotation of the spool for winding by the motor may be automatically started when the spool is moved to winding position and automatically stopped when the spool is moved from winding position to casting position; to provide such a reel in which the motor for rotating the spool for winding purposes may be powered by one or more batteries or the like, contained in the reel; and to provide such a reel which is readily manufactured and effective in operation.

Additional objects and the novel features of this invention will become apparent from the description which follows, taken in connection with the accompanying drawings, in which:

FIG. 3 is a top plan view similar to FIG. 2, but taken obliquely from the opposite side and showing the spool in winding position;

FIG. 4 is a fragmentary longitudinal section, taken along line 4—4 of FIG. 2;

FIG. 5 is a side elevation of the spool and spool support, with the flange of the support broken away to show one flange of the spool more clearly;

FIG. 10 is a cross section taken along line 10—10 of FIG. 4.

Figure 1:
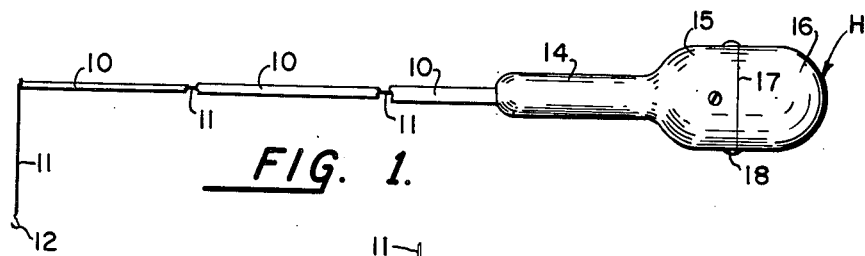
FIG. 1 is a condensed side elevation of a reel housing and rod, the reel being constructed in accordance with the present invention.
Figure 2:
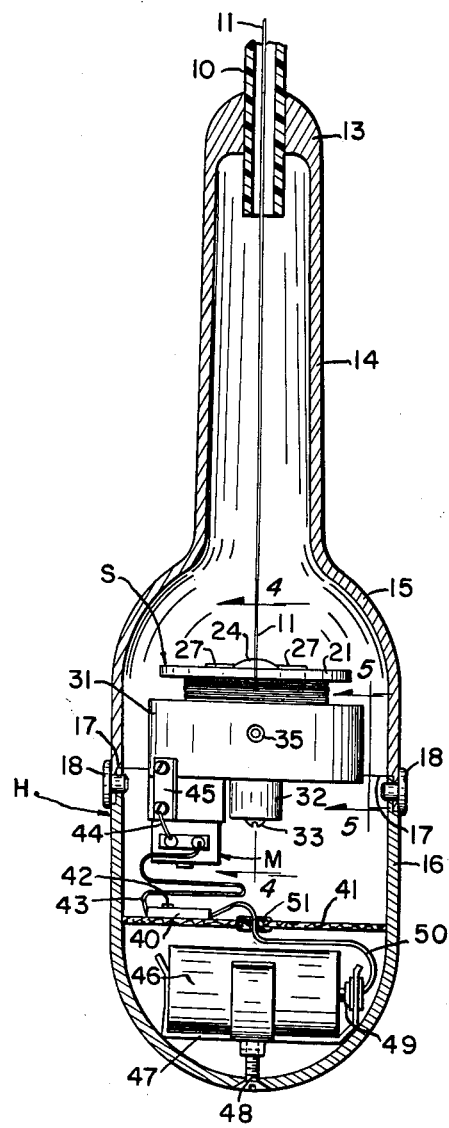
FIG. 2 is an enlarged top plan view, taken obliquely from one side, of the parts within the reel housing, the housing and a portion of the rod being in longitudinal section.

A reel constructed in accordance with this invention, as illustrated in FIGS. 1 and 2, may be self-contained by being installed within a reel housing H, to the front end of which is attached a rod 10, which may be hollow so that a line 11 will extend therethrough, although it will be understood that guides for line 11 may be mounted on the outside of rod 10 in a conventional manner. A hook 12 is shown as attached to the outer end of line 11, although it will be understood that a dry or wet fly, a spinner, or other types of fishing tackle, including a float, a weight or the like, may be attached to the outer end of the line. The rod 10 is conveniently made of a relatively light but strong material, such as a fibreglass reinforced plastic, although other conventional types of rod material are suitable. Conventionally, rod 10 may be formed of sections of decreasing diameter, from the inner to the outer end, with the inner section extending into an opening provided for that purpose at a thicker section 13 at the outer end of a tubular portion 14 of one half of housing H, a bell shaped portion 15 extending rearwardly from tubular portion 14 and generally forming a cylinder of larger diameter than tubular portion 14. The other half of housing H may be formed as a cup 16, one end of which may be closed as a hemisphere and the opposite end cylindrical, with bell 15 and cup 16 being adapted to interfit together, as at a joint 17 formed by interfitting, longitudinally extending flanges. The cup 16 may be removably attached to bell 15 by oppositely disposed plugs 18, or in any other suitable manner. Housing H is conveniently formed of a light metal, such as aluminum, which may be cast or formed to the desired shape, while the plugs 18 may be threaded into holes in the flanges at joint 17, or may conveniently be formed of a plastic, such as polyethylene, which causes plugs 18 to be held by friction in the holes provided for that purpose.

A spool S, on which line 11 is wound and from which the line is unwound during casting, may be provided, as in FIGS. 4 and 5, with an inner flange 20 and an outer flange 21, the latter extending radially and outwardly from a central cylindrical hub 22. As will be evident, the space outside central hub 22, between flanges 20 and 21, receives the line 11, while the well formed inside cylindrical hub 22 permits the spool S to be mounted for rotation on a pin 23, with the spool held on the pin by a nut 24, which engages threads 25 at the end of pin 23 and acts against a spacer 26, to permit the nut 24 to be placed in a more accessible position. Nut 24 conveniently has a pair of wings 27, as in FIG. 2, for more readily turning the nut manually. Pin 23 is mounted on a pivotal support 30 having a cylindrical side flange 31 which extends past the inner flange 20 of spool S, as in FIGS. 4 and 5, while pin 23 extends through a spacing ring 32 and through support 30, being held in position by a screw 33.

The support 30 is pivotally mounted, so that both the support and the spool S may turn from the casting position of FIG. 2 to the winding position of FIG. 3 and vice versa. Thus, the flange 31 of support 30 may be provided on opposite sides with bearings 34 and 35, such as formed of nylon, in which the point of a pivot pin 36 extends, each pivot pin 36 conveniently being provided with a conical point and threaded through a hole 37 in bell 15. As will be evident, due to the diametrically opposite pivot points of the support 30 and the fact that spool S will turn with the support, the spool and the support may be turned between the position of FIG. 2 and the position of FIG. 3. In the position of FIG. 2, the axis of the spool coincides with the longitudinal axis of housing H, so that the line may therefore unwind readily from the spool, by passing around flange 21 in a circular manner, while in the position of FIG. 3, the axis of the spool and its support extend generally transversely to the longitudinal axis of the housing, so that the line 11 will be wound onto the spool when the spool is rotated in an appropriate direction.

In accordance with the present invention, a motor M, for turning spool S, is mounted on spool support 30 in such a position that the weight of the motor will cause the spool and its support to swing between the casting and winding positions and vice versa. For this purpose, motor M is conveniently mounted adjacent one edge of support 30 and intermediate bearings 34 and 35, i.e., approximately 90° from each bearing 34 and 35. If the housing H is held with its longitudinal axis in a horizontal position, or at an angle within 45°, for instance, of the horizontal, and turned so that the bearings 34 and 35 lie in a horizontal plane, or in a plane inclined up to about 45° to the horizontal, the weight of motor M will cause the support 30 and spool S to swing to one side or the other.

Figure 6:
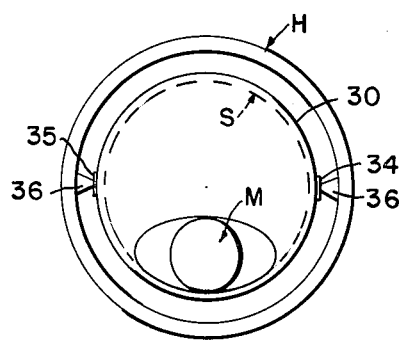
FIG. 6 is a diagrammatic end view of a housing and spool of the reel of FIG. 2, showing the housing in one generally horizontal position, corresponding to FIG. 2.
Figure 8:
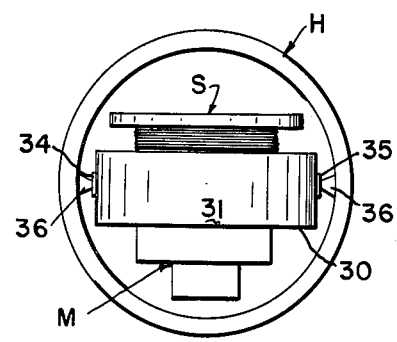
FIG. 8 is a view similar to FIG. 6, but with the housing rotated through 180° and corresponding to FIG. 3.

Thus, if the housing H is rotated about its longitudinal axis in one direction, until the plane of the bearings 35 and 34 is horizontal, as in FIG. 6, so that the motor M is on the lower side, the weight of the motor will cause the spool and its support to swing transversely of the housing, i.e., to the casting position of FIG. 2, the difference between the housing position of FIGS. 2 and 6 being explained later. Thus, if housing H is rotated 180°, to the position of FIG. 8, so that the bearings 34 and 35 are in a horizontal plane but reversed in position, motor 35 will first be moved to a position above the horizontal axis, but the weight thereof will cause the motor to fall to a lower position, which will cause the spool and its support to pivot to the position of FIG. 8, in which the motor is again below the axis of the bearings 34 and 35, but the spool axis transverse to the axis of housing H, i.e., the winding position of FIG. 3.

Figure 7:
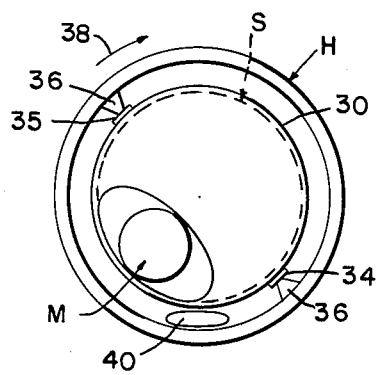
FIG. 7 is a view similar to FIG. 6, but with the housing rotated through approximately 45° therefrom.
Figure 9:
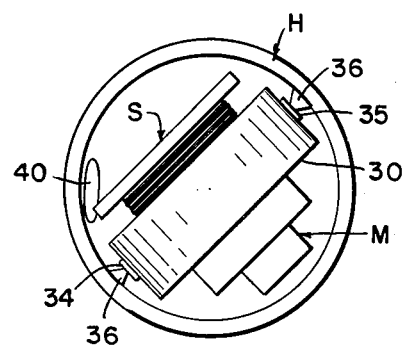
FIG. 9 is a view similar to FIG. 8, but with the housing rotated to approximately 45° therefrom.

As a practical matter, it is unnecessary to rotate the housing H through 180°, in order to move spool S and its support from the casting to the winding position and vice versa, since a total movement of 88°, for instance, is sufficient, as illustrated in FIGS. 7 and 9. Thus, with the housing turned so that the axis of bearings 34 and 35 is included up to 46° to the horizontal, but with motor M still on the lower side of the axis, the weight of the motor will cause spool S and its support to be disposed transversely of the housing, as in FIG. 7, it being noted that FIG. 2 is taken from a position looking obliquely downwardly from the left, with the parts in the position of FIG. 7 and that the spool position of FIGS. 2 and 7 is thus the same, i.e., the casting position. By rotating the housing in the direction of arrow 38 of FIG. 7 through 88°, to the position of FIG. 9, the motor will at first be moved above the horizontal axis of the spool, but the weight of the motor will cause the spool and its support to swing about bearings 34 and 35 at pins 36, so that the axis of the spool will then be transverse to the axis of the housing, the position of FIG. 9 and also the position of FIG. 3, i.e., the winding position, it being noted that FIG. 3 is taken from a position looking obliquely downwardly from the right, with the parts in the position of FIG. 9. Since in FIG. 9, the axis of the spool is transverse to the axis of the housing, but in FIG. 7 the axis of the spool extends in the same direction as the axis of the housing, an appropriate legend may be placed on the outside of the housing to indicate which point should be uppermost for the casting position of FIG. 7 and which point should be uppermost for the winding position of FIG. 9. As will be evident from FIGS. 6 and 8, the housing may be turned past the position of FIGS. 7 and 9, in either direction, without adversely affecting the desired position of the spool S for casting or winding, as the case may be.

In further accordance with this invention, a gravity operated switch 40, such as a mercury contact switch, in the circuit of motor M, may be mounted on a disc 41 of FIGS. 2 and 3, formed of insulating material and disposed in cup 16 rearwardly of the motor spool. As indicated in FIGS. 7 and 9, switch 40 is placed at an angular position such that, when the housing is in the position of FIG. 7, the switch 40 will be generally horizontal and the mercury therein will close the circuit across the contacts thereof, to start motor M with the spool in winding position, but when the housing H is moved to the position of FIG. 9, switch 40 will be in an approximately vertical position and the mercury therein will no longer bridge the contacts, preferably prior to reaching the approximately vertical position, so that motor M will be stopped with the spool in casting position. For convenience, switch 40 is superimposed on FIGS. 7 and 9 to indicate the operation thereof, but not necessarily the exact position, which may vary with the type of switch used, depending on the angular movement necessary to open and close the particular switch involved. Again, as in FIGS. 2 and 3, the switch 40 may be attached to disc 41 by a clip 42, while an insulated lead wire 43 from switch 40 to motor M has sufficient slack that the motor will readily move between the positions shown in FIGS. 2 and 3, i.e., the positions of FIGS. 7 and 9. The opposite side of motor M, which may be a six volt motor of the permanent magnet type, may be connected by a ground wire 44 to a conductor bar 45 which is grounded to the spool. The spool, in turn, is grounded through bearings 36 to housing H. Current to motor M may be supplied by one or more batteries 46, mounted in a clip 47 attached to the inner end of bell 16 by screw 48. The clip 47, of course, grounds one end of the battery to the housing H, completing the circuit back to motor M, while the opposite end or tip of the battery engages an insulated contact 49, from which an insulated wire 50 leads to switch 40, through an insulator 51 mounted in disc 41.

Disc 41 may be made of compressed fiber or other light weight, non-conducting material and provision should be made for placing disc 41 within bell 16 at the angular position necessary to position switch 40 at its desired position. Thus, indicating marks on disc 41 and the inside of bell 16 may be utilized, or other appropriate means of identifying the correct angular position of disc 41. If desired, a projection may be punched inwardly in bell 16, with a corresponding slot at one point of the edge of disc 41, so that the slot may be fitted over the projection with the disc inserted in the bell. If desired, an off-on toggle type switch may be provided, such as connected in wire 50 and mounted in a slot in bell 16 at an appropriate position, so that the lead from the battery to the motor may be disconnected when the reel is not in use, to prevent running the battery down, in the event that the reel is accidentally placed in the winding position.

Since the normal speed of motor M will usually be considerably greater than that desired for rotation of spool S, a speed reduction gear train may be conveniently located within support 30, in the space between the support and inner flange 20 of the spool. As illustrated in FIG. 10, such speed reduction gearing may be driven by the motor shaft 55, on which is mounted a pinion 56, with a washer 57 between the pinion 56 and the base of support 30. Pinion 56 drives a gear 58, rotatable about a shaft 59 and conveniently integral with a pinion 60, which in turn drives a ring gear 61, conveniently connected for driving purposes to the inner flange 20 of spool S through a friction ring 62 of FIG. 4, shown also in FIG. 4, which also spaces gear 61 from the flange 20, to permit engagement by pinion 60. Pin 23, of course, extends centrally of ring gear 61 and ring 62.

Nut 24 is conveniently adjustable so that the friction of ring 62 against gear 61 will permit the spool to slow down, or rotate in the reverse direction, in the event that the pull on the line approaches the breaking strength of the line. For this purpose, gear 61 is rotatable in a groove 63 on pin 23 and engages a friction ring 62, cemented or otherwise suitably attached to the rear side of flange 20 of spool S. Motor M and shaft 59 are mounted on support 30, while a shoulder 64 on pin 23 engages the side of support 30 opposite spacing ring 32, to mount pin 23 securely on support 30.

It will be noted that line 11 is wound onto spool S as shown in FIG. 3, while the line spins off the side of the spool when casting, as shown in FIG. 2. Because of this difference in the manner in which the line is wound onto the spool and the manner in which the line is cast from the spool, the line may gradually become twisted. Should the line become greatly twisted, slack in the line may result in tangling and possible knotting of the slack portions along the line. This problem may be avoided by occasionally casting the line out onto dry land and dragging it therealong, until the line untwists itself. Also, it has been found that a braided line is much less subject to twisting and tangling than a monofilament line.

From the foregoing, it will be evident that a fishing reel constructed in accordance with this invention fulfills to a marked degree the requirements and objects hereinbefore set forth. A fishing reel is provided in which the motor for rotating the spool, to wind the line onto the spool, is automatically started by turning the reel through a predetermined angle, and the motor is automatically stopped by turning the reel back. This is readily accomplished by mounting a gravity operated switch, such as a mercury switch in the housing and at an angle to the pivotal axis of the housing, so that upon turning the housing about its longitudinal axis, the mercury switch will cause the motor to be automatically started, and when the housing is turned back, the motor will be automatically stopped. Also, the spool may be pivoted from a casting position to a winding position by merely rotating the reel about its longitudinal axis, the same being accomplished because the motor is mounted on the spool support in offset relation to the pivotal axis thereof, so that upon turning the reel about its longitudinal axis, the weight of the motor will cause the spool and support to be pivoted about its axis which is transverse to the longitudinal axis of the reel. The batteries for operating the motor may be located within the housing and are easily accessible for replacement. It will be understood, of course, that certain features of the invention may be utilized without the necessity of utilizing others.

Although a preferred embodiment of this invention has been illustrated and described, it will be understood that other embodiments may exist and various changes and variations made, without departing from the spirit and scope of this invention.

What is claimed is:

1. In a fishing reel, a housing having a front half and a rear half; means interconnecting said front half and said rear half; spool support means pivotally mounted within said front half for pivotal movement about an axis perpendicular to the longitudinal axis of said housing; a spool mounted on said support for rotation about an axis perpendicular to said pivotal axis; a motor mounted on said support and offset from said pivotal axis; a gear train interconnecting said motor with said spool; a battery mounted in the rear half of said housing; and a mercury switch electrically connected between said battery and said motor and mounted within said housing at an angle to the pivotal axis of said housing.

2. In a fishing reel as set forth in claim 1, including a disc mounted within said rear half of said housing adjacent said battery, said mercury switch being mounted on said disc.

3. In a fishing reel, a housing having a front half and a rear half; means interconnecting said front half and said rear half; a cup-shaped support having a base and a peripheral flange; pivot means interconnecting said front half of said housing with said flange for pivotal movement of said support about an axis perpendicular to the longitudinal axis of said housing; a spool shaft having an end extending through said base of said support; a spool mounted on said shaft for rotation about an axis perpendicular to said pivotal axis; a motor mounted on the side of said base opposite said spool and offset from said pivotal axis; a gear train mounted on the side of said base adjacent said spool and interconnecting said motor with said spool; a friction washer surrounding said spool shaft and engaging said spool and a gear of said gear train; a spacer enclosing said end of said shaft outwardly of said support; a wing nut threadably engaging the outer end of said shaft and urging said spacer and said spool toward said friction washer; a battery mounted in the rear half of said housing; and a mercury switch electrically connected between said battery and said motor and mounted within said housing at an angle to the pivotal axis of said housing.

4. In a fishing reel as set forth in claim 3, in which said pivot means for said support includes a pair of ring bearings mounted in diametrically opposite positions on said flange of said support; and bearing pins extending inwardly from said housing and engaging said ring bearings for pivotal rotation of said support.

5. In a fishing reel as set forth in claim 4, in which said support is pivoted about said bearing pins between a winding position and a casting position by the weight of said motor by pivoting said housing about its longitudinal axis through an angle of approximately 88°.

6. In a fishing reel, a housing having a longitudinal axis; a rotatable spool; a spool support pivotally mounting said spool within said housing for movement between a casting position and a winding position; an electric motor mounted on said spool support, offset from the axis of rotation thereof and connected to said spool; means for supplying current to said motor; and a gravity operated switch connected in said housing between said current supplying means and said motor and disposed at an angle to said longitudinal axis of said housing so that said motor will be started upon pivoting said housing in one direction about said longitudinal axis to a position causing the weight of said motor to pivot said spool to said winding position and said motor will stop upon pivoting of said housing in the opposite direction about said longitudinal axis to a position in which the weight of said motor causes said spool to pivot to said casting position.

7. In a fishing reel, a housing; a rotatable spool within said housing; mounting means pivotally connecting said rotatable spool to said housing so that said spool may pivot bodily about an axis normal to the axis of rotation of said spool between a winding position and a casting position; a motor operatively connected to said spool and offset from the axis of said pivot means for causing said spool to be pivoted with said mounting means when said housing is turned about its longitudinal axis; a battery within said housing; and a mercury switch positioned within said housing and connected between said motor and said battery, so that said motor will be started upon pivoting said housing in one direction about its longitudinal axis to a position causing the weight of said motor to pivot said spool and said mounting means to said winding position and said motor will stop upon pivoting of said housing in the opposite direction and to a position in which the weight of said motor causes said spool and mounting means to pivot to said casting position.

References Cited in the file of this patent

UNITED STATES PATENTS

| | | |
|---|---|---|
| 2,367,888 | Prideaux | Jan. 23, 1945 |
| 2,746,695 | Clay | May 22, 1956 |
| 2,752,717 | Lind | July 3, 1956 |
| 2,776,515 | Lynch | Jan. 8, 1957 |
| 2,896,875 | Reed et al. | July 28, 1959 |